J. N. PARKINSON.
LID HOLDER FOR VESSELS.
APPLICATION FILED MAR. 24, 1913.
1,084,817.
Patented Jan. 20, 1914.
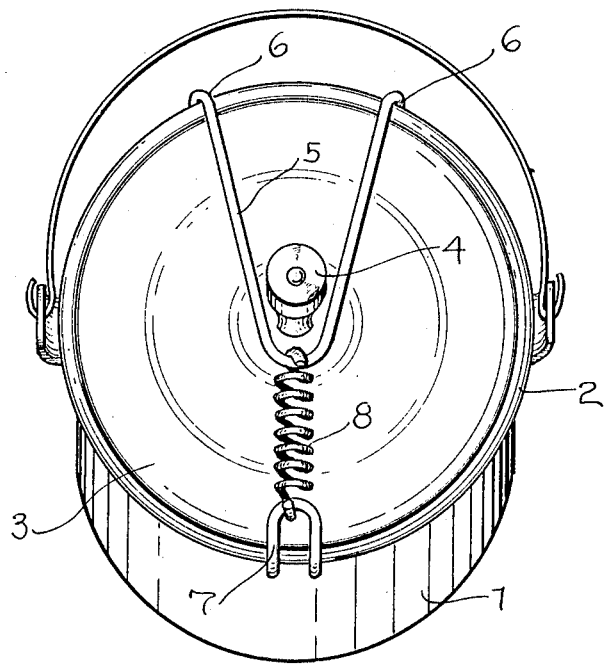
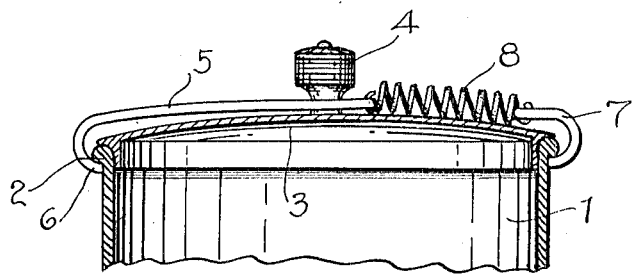
Inventor
J. N. PARKINSON
Witnesses
Robert M. Sutphen
A. S. Hind
By Watson E. Coleman
Attorney

UNITED STATES PATENT OFFICE.

JAMES N. PARKINSON, OF STILES JUNCTION, WISCONSIN.

LID-HOLDER FOR VESSELS.

1,084,817.  Specification of Letters Patent.  Patented Jan. 20, 1914.

Application filed March 24, 1913. Serial No. 756,624.

*To all whom it may concern:*

Be it known that I, JAMES N. PARKINSON, a citizen of the United States, residing at Stiles Junction, in the county of Oconto and State of Wisconsin, have invented certain new and useful Improvements in Lid-Holders for Vessels, of which the following is a specification, reference being had to the accompanying drawings.

This invention relates to new and useful improvements in lid holders for vessels and has for its object to provide an improved device of this character which, when applied to use, will securely hold the lid on the vessel and prevent the spilling of the contents of the latter.

A further object of the invention resides in providing a device consisting of a pair of hook members connected together by means of a coil spring, said hook members being adapted to engage the bead or edge of the receptacle, and a still further object resides in providing a device which is extremely simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claim.

In the accompanying drawing forming a part of this application, Figure 1 is a perspective view of a receptacle, showing my device applied to use thereon; and Fig. 2 is a fragmentary vertical section therethrough.

In describing my invention, I shall refer to the drawings in which similar reference characters designate corresponding parts throughout the several views and in which—

1 indicates a receptacle of any desired type, having the usual bead or outwardly curved edge 2 formed at the upper portion thereof and a cover or lid 3 is provided therefor, the same being provided with a knob or finger piece 4 in the central portion thereof.

My invention contemplates the provision of a means to secure said lid in position on the receptacle at any time during the use of the latter and to this end, a substantially V-shaped member 5 is provided, the same being formed of a single piece of wire or the like. The outer ends of the arms of this V-shaped member are bent downwardly and inwardly to form the hooks 6. An additional hook member 7 is provided, the same being formed from a piece of wire which is looped and bent intermediate of its ends and the looped portion of this latter hook 7 is connected with the looped or base portion of the substantial V-shaped member 5 by means of a coil spring 8.

In applying the device to use, the lid or cover 3 is first applied to the receptacle, whereupon the hooks 6 of the V-shaped member 5 are engaged with the bead 2 of the receptacle on one side thereof and the V-shaped member permitted to rest on the lid or cover, to receive between the arms thereof, the knob or finger piece 4. The coil spring 8 is then expanded and the hook member 7 engaged with the bead of the receptacle at a point opposite that engaged by the hook members 6. When so engaged, the device will be securely held on the receptacle and the lid or cover 3 held in position against movement. The V-shaped member 5 is so formed that the arms thereof are but slightly spaced from the finger piece or knob 4, when the device is properly applied to use and thus, should the hook member 7 be moved along the edge or bead of the receptacle, during the use thereof, the one arm or the other of said V-shaped member will contact with said knob 4. In this manner, said knob will act as a fulcrum point and the member 5 will be swung therefrom in an opposite direction to the movement of the hook member 7. This movement of the hook member 7 is, of course, only a casual movement that might occur, through the striking thereof with some object during the carrying of the receptacle, from place to place, but in such an instance, it will be seen that the movement of this hook member 7 will not totally disengage the device from the receptacle.

From the foregoing it will be seen that I have provided a simple, inexpensive and efficient means for carrying out the objects of the invention and while I have particularly described the elements best adapted to perform the functions set forth, it is obvious that various changes in form, proportion, and in the minor details of construction may be resorted to without departing from the spirit or sacrificing any of the principles of the invention.

Having thus described this invention, what is claimed is:—

A lid holder for receptacles comprising a V-shaped member, the free ends of the arms of which are bent to form hooks to engage the bead of a receptacle, said V-shaped member being adapted to rest on the cover of the receptacle and receive the finger piece thereof between the arms and adjacent the base of the same, an additional hook member adapted to be engaged with the bead of the receptacle at a point opposite that engaged by the aforesaid hooks, and a coil spring connecting the base of said V-shaped member with said additional hook.

In testimony whereof I hereunto affix my signature in the presence of two witnesses.

JAMES N. PARKINSON.

Witnesses:
 L. C. HARVEY,
 O. B. GEORGE.

---

Copies of this patent may be obtained for five cents each, by addressing the "Commissioner of Patents, Washington, D. C."